(12) United States Patent
Bard

(10) Patent No.: US 11,654,593 B2
(45) Date of Patent: May 23, 2023

(54) SYSTEM AND METHOD FOR FORMING SURFACE DESIGNS IN HARD-SETTING MATERIALS

(71) Applicant: Carnegie Mellon University, Pittsburgh, PA (US)

(72) Inventor: Joshua David Bard, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 293 days.

(21) Appl. No.: 16/441,457

(22) Filed: Jun. 14, 2019

(65) Prior Publication Data

US 2020/0247006 A1 Aug. 6, 2020

Related U.S. Application Data

(60) Provisional application No. 62/918,620, filed on Feb. 6, 2019.

(51) Int. Cl.
| | |
|---|---|
| *B28B 11/08* | (2006.01) |
| *E04C 2/30* | (2006.01) |
| *B28B 1/00* | (2006.01) |
| *B33Y 50/02* | (2015.01) |
| *B33Y 10/00* | (2015.01) |
| *B33Y 40/00* | (2020.01) |
| *B28B 17/00* | (2006.01) |

(52) U.S. Cl.
CPC .......... *B28B 11/0827* (2013.01); *B28B 1/001* (2013.01); *B28B 17/0081* (2013.01); *B33Y 10/00* (2014.12); *B33Y 40/00* (2014.12); *B33Y 50/02* (2014.12); *E04C 2/30* (2013.01)

(58) Field of Classification Search
CPC . B28B 11/0827; B28B 1/001; B28B 17/0081; B33Y 10/00; B33Y 40/00; B33Y 50/02; E04C 2/30
See application file for complete search history.

(56) References Cited

U.S. PATENT DOCUMENTS

| | | | |
|---|---|---|---|
| 7,641,461 B2 * | 1/2010 | Khoshnevis | ........ E04G 21/0463 425/375 |
| 2004/0006405 A1 * | 1/2004 | Chen | .................. G05B 19/4099 700/119 |

OTHER PUBLICATIONS

Khoshnevis, Automated construction by contour crafting-related robotics and information technologies, Automation in Construction, vol. 13, Issue 1, Jan. 2004, pp. 5-19 (Year: 2004).*

(Continued)

*Primary Examiner* — Yung-Sheng M Tsui
(74) *Attorney, Agent, or Firm* — The Webb Law Firm

(57) ABSTRACT

Provided is a system, method, and apparatus for forming surface designs in hard-setting materials. The method includes depositing a hard-setting material mix to create a construction component, controlling a movable unit to manipulate a surface of the construction component with a first profile tool arranged on the movable unit based on surface design data before the hard-setting material mix sets, and controlling the movable unit or at least one other movable unit to manipulate the surface of the construction component with a second profile tool arranged on the movable unit or the at least one other movable unit based on the surface design data before the hard-setting material mix sets, wherein the second profile tool comprises a blade edge and a trowel edge.

8 Claims, 10 Drawing Sheets

(56) References Cited

OTHER PUBLICATIONS

Khoshnevis, Automated construction by contour crafting-related robotics and information technologies, Automation in Constructior, vol. 13, Issue 1, Jan. 2004, pp. 5-19 (Year: 2004).*

Bard et al, Reality is interface: Two motion capture case studies of human-machine collaboration in high-skill domains, Oct. 2016, International Journal of Architectural Computing 14(4). (Year: 2016).*

Bard et al., "Recovering architectural plaster by developing custom robotic tools", Morphfaux, 2013, https://doi.org/10.1007/978-3-7091-1465-0_13, pp. 139-142.

Cupkova et al., "Mass Regimes: Geometric Actuation of Thermal Behavior", International Journal of Architectural Computing, 2015, pp. 169-193, vol. 13, Issue 2.

Cupkova et al., "Morphologicall Controlled thermal Rate of Ultra High Performance Concrete", MRS Proceedings vol. 1800, 2015, 9 pages.

Cupkova et al., "Modulating Thermal Mass Behavior Through Surface Figuration", ACADIA 2017 | DISIPLINES + DISRUPTION, 2017, pp. 202-211.

Khoshnevis, "Automated construction by contour crafting-related robotics and information technologies", Automation in Construction, 2004, pp. 5-19, vol. 13.

Leemann et al., "The effect of viscosity modifying agents on mortar and concrete", Cement & Concrete Composites, 2007, pp. 341-349, vol. 29.

Lim et al., "Developments in construction-scale additive manufacturing processes", Automation in Construction, 2012, pp. 262-268, vol. 21.

Marar et al., "Effect of cement content and water/cement ratio on fresh concrete properties without admixtures", International Journal of the Physical Sciences, Oct. 2011, pp. 5752-5765, vol. 6, No. 24.

Marchon et al., "Molecular and submolecular scale effects of comb-copolymers on tri-calcium silicate reactivity Toward molecular design", J Am Ceram Soc, 2017, pp. 817-841, vol. 100.

Mehta et al., "CONCRETE Microstructure, Properties and Materials", 2001, 239 pages.

Soar et al., "The Role of Additive Manufacturing + Physiomimetic Computational Design for Digital Construction", Architectural Design, 2012, pp. 126-135, vol. 82, No. 2.

Wangler et al., "Ditigal Concrete: Opportunities and Challenges", RILEM Technical Letters 1, 2016, pp. 67-75.

Yamada et al., "Controlling of the adsorption and dispersing force of polycarboxylate-type superplasticizer by sulfate on concentration in aqueous phase", Cement and Concrete Research 31, 2001, pp. 375-383.

Yao, "Natural convection along a vertical complex wavy surface", International Journal of Heat and Mass Transfer 49, 2006, one page Abstract.

* cited by examiner

SYSTEM AND METHOD FOR FORMING SURFACE DESIGNS IN HARD-SETTING MATERIALS

CROSS-REFERENCE TO RELATED APPLICATION

This application claims priority to U.S. Provisional Patent Application No. 62/918,620, filed Feb. 6, 2019, the disclosure of which is hereby incorporated by reference in its entirety.

BACKGROUND OF THE INVENTION

1. Field

This disclosure relates generally to three-dimensional fabrication and, in non-limiting embodiments, to a system and method for forming surface designs in hard-setting materials.

2. Technical Considerations

There are several advantages to using custom, fine-tuned construction components, such as building panels. For example, such customization allows for environmental features for a specific climate or region. However, typical fabrication methods for such construction components involve the expensive process of creating a mold for each specific surface design and size of panel. This is inefficient and wasteful for custom surface designs that will only be used a limited number of times. Although molds represent a low percentage of the unit-based cost of mass-produced concrete panels, they can represent up to 80% of the unit cost for customized concrete products.

SUMMARY

According to non-limiting embodiments or aspects, provided is a method for forming construction components with three-dimensional surface designs, comprising: depositing a hard-setting material mix to create a construction component; controlling, with at least one processor, a movable unit to manipulate a surface of the construction component with a first profile tool arranged on the movable unit based on surface design data before the hard-setting material mix sets; and controlling, with at least one processor, the movable unit or at least one other movable unit to manipulate the surface of the construction component with a second profile tool arranged on the movable unit or the at least one other movable unit based on the surface design data before the hard-setting material mix sets, the second profile tool comprises a blade edge and a trowel edge.

In non-limiting embodiments or aspects, the first profile tool comprises a blade edge and a trowel edge, and the trowel edge of the first profile tool comprises a different shape than the trowel edge of the second profile tool. In non-limiting embodiments or aspects, wherein controlling the movable unit to manipulate the surface of the construction component with the first profile tool comprises repeatedly moving the first profile tool along an axis substantially perpendicular to the surface of the construction component while simultaneously moving the first profile tool along an axis substantially parallel to the surface of the construction component. In non-limiting embodiments or aspects, wherein repeatedly moving the first profile tool along the axis substantially perpendicular to the surface of the construction component comprises oscillating the first profile tool. In non-limiting embodiments or aspects, wherein depositing the hard-setting material mix comprises: controlling, with at least one processor, a pump to move the hard-setting material mix from a pressurized vessel through a conduit, wherein an end of the conduit comprises a dispensing unit arranged on the movable unit; and controlling, with at least one processor, the movable unit to selectively deposit the hard-setting material mix from the dispensing unit. In non-limiting embodiments or aspects, the first profile tool is arranged adjacent to the end of the conduit such that the hard-setting material mix is manipulated by the first profile tool as it is being deposited. In non-limiting embodiments or aspects, the hard-setting material mix is deposited within a panel frame. In non-limiting embodiments or aspects, the surface design data comprises layer data for each layer of a plurality of layers, wherein each layer corresponds to a different profile tool of a plurality of profile tools including the first profile tool and the second profile tool.

According to non-limiting embodiments or aspects, provided is a method for forming construction components with three-dimensional surface designs, comprising: depositing a hard-setting material mix to create a construction component; controlling, with at least one processor, a movable unit to manipulate a surface of the construction component with a profile tool arranged on the movable unit based on surface design data before the hard-setting material mix sets, wherein the profile tool comprises a blade edge and a trowel edge; and controlling, with at least one processor, a motor connected to the profile tool to repeatedly move the profile tool along an axis substantially perpendicular to the surface of the construction component.

In non-limiting embodiments or aspects, controlling the movable unit to manipulate the surface of the construction component with the profile tool comprises moving the profile tool along an axis substantially parallel to the surface of the construction component while the profile tool is repeatedly moving along the axis substantially perpendicular to the surface of the construction component. In non-limiting embodiments or aspects, depositing the hard-setting material mix comprises: controlling, with at least one processor, a pump to move the hard-setting material mix from a pressurized vessel through a conduit, wherein an end of the conduit comprises a dispensing unit arranged on the movable unit; and controlling, with at least one processor, the movable unit to selectively deposit the hard-setting material mix from the end of the conduit. In non-limiting embodiments or aspects, the hard-setting material mix is deposited within a panel frame. In non-limiting embodiments or aspects, the profile tool is arranged adjacent to the dispensing unit such that the hard-setting material mix is manipulated by the profile tool as it is being deposited.

According to non-limiting embodiments or aspects, provided is a system for forming construction components from a hard-setting material mix, comprising: at least one movable unit configured to move in three dimensions; and at least one processor programmed or configured to: control the at least one movable unit to manipulate a surface of a construction component formed with the hard-setting material mix with a first profile tool based on surface design data before the hard-setting material mix sets; and control the at least one movable unit to manipulate the surface of the construction component with a second profile tool based on the surface design data before the hard-setting material mix sets, wherein the second profile tool comprises a blade edge and a trowel edge. In non-limiting embodiments or aspects, the system further comprises the first profile tool, the first profile tool comprising a blade edge and a trowel edge.

In non-limiting embodiments or aspects, the at least one processor is further programmed or configured to repeatedly move at least one of the first profile tool and the second profile tool along an axis substantially perpendicular to the surface of the construction component while simultaneously manipulating the surface of the construction component with at least one of the first profile tool and the second profile tool.

According to non-limiting embodiments or aspects, provided is a system for forming construction components, comprising: at least one movable unit configured to move in three dimensions; a delivery nozzle arranged on the at least one movable unit and in fluid communication with a vessel comprising a hard-setting material mix; a profile tool arranged on the at least one movable unit; and at least one processor programmed or configured to: control the movable unit to deposit the hard-setting material mix to create a construction component; and control the movable unit to manipulate a surface of the construction component with the profile tool based on surface design data before the hard-setting material mix sets. In non-limiting embodiments or aspects, the at least one profile tool comprises a blade edge and a trowel edge. In non-limiting embodiments or aspects, the at least one processor is further programmed or configured to repeatedly move the profile tool along an axis substantially perpendicular to the surface of the construction component while simultaneously manipulating the surface of the construction component with the profile tool. In non-limiting embodiments or aspects, the surface of the construction component is manipulated by moving the profile tool along an axis substantially parallel to the surface of the construction component. In non-limiting embodiments or aspects, the delivery nozzle is arranged adjacent to the profile tool such that the hard-setting material mix is manipulated by the profile tool as it is being deposited.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments that are illustrated in the accompanying schematic figures, in which.

DESCRIPTION

Figure 1:
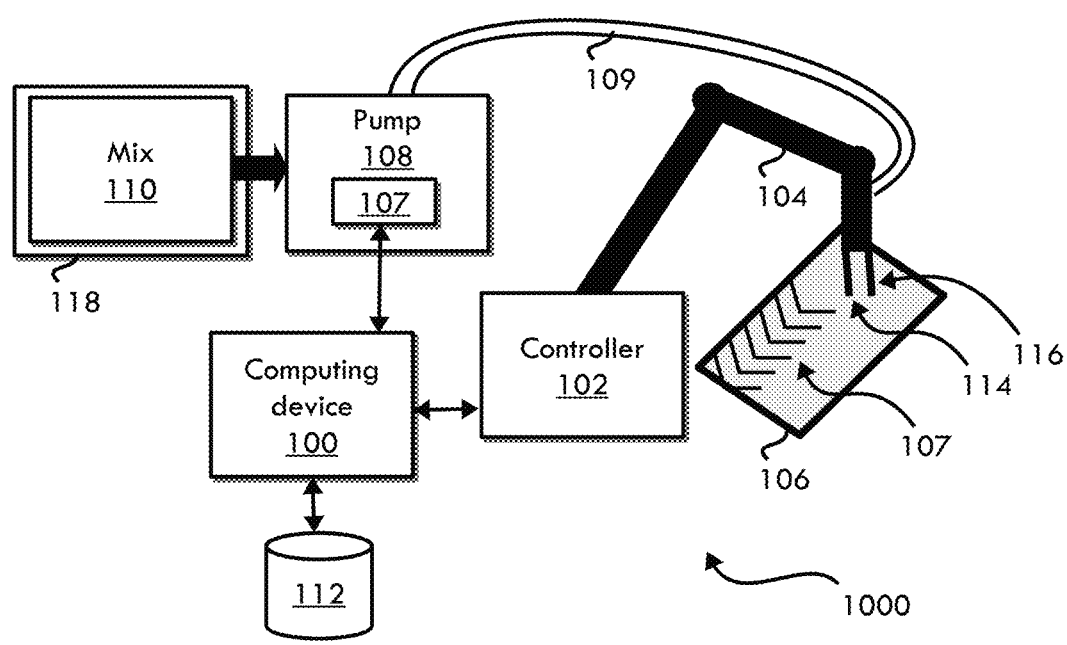
FIG. 1 is a schematic diagram of a system for forming surface designs in hard-setting materials according to a non-limiting embodiment.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

As used herein, the term "hard-setting material mix" may refer to any form of unset and malleable material that hardens (e.g., "sets") after being formed such as, but not limited to, concrete, cement, plaster, gypsum, clay, porcelain clay, and/or the like.

As used herein, the term "construction component" may refer to an interior or exterior component used in the structure or design of a building project. A construction component may include, but is not limited to, panels (e.g., wall panels, exterior panels, ceiling panels, etc.), moulding, aesthetic elements, and/or the like.

As used herein, the term "pass" may refer to a motion or set of motions associated with manipulating a surface with a tool. For example, in non-limiting embodiments, a pass may include a path of motion of a profile tool having a starting location, an ending location, and a three-dimensional trajectory.

As used herein, the term "surface design" may refer to one or more three-dimensional patterns, designs, geometries, topographies, and/or the like formed on one or more surfaces of an object.

As used herein, the term "computing device" may refer to one or more electronic devices configured to process data. A computing device may be a processor. In some examples, a computing device may include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device, and/or other like devices. A computing device may also be a desktop computer or other form of non-mobile computer. Multiple computing devices directly or indirectly communicating in the network environment may constitute a "system." Reference to "a processor," as used herein, may refer to a previously-recited processor that is recited as performing a previous step or function and/or a different processor. For example, as used in the specification and the claims, a first processor that is recited as performing a first step or function may refer to the same or different processor recited as performing a second step or function.

In non-limiting embodiments, provided is a system and method for forming surface designs in hard-setting materials in an efficient manner that allows for short-run customization. Through the use of custom surface designs, designers can create construction components for environmental, and/or acoustical benefits, increased creative expression, and/or other advantages. Non-limiting embodiments utilize a hybrid additive and subtractive fabrication process to three-dimensionally print and form the construction components and surface designs thereof. For example, a rough layer of a hard-setting material mix may be deposited to create an unrefined shape. Profile tools may then be used to refine the shape of the surface of the construction component and to create the details of the custom surface designs. In some non-limiting embodiments, a plurality of different profile tools, including a hybrid profile tool with both a blade edge and a trowel edge, is used to make multiple passes over the construction component before the hard-setting material mix sets.

Referring now to FIG. 1, shown is a system 1000 for forming surface designs in hard-setting materials according to a non-limiting embodiment. The system includes a computing device 100 in communication with a surface profile database 112. The computing device is also in communication with a controller 102, which may include a computing device configured to control one or more movable units 104. The movable unit 104 may include, for example, a robotic arm, print head, or any other movable device capable of supporting one or more profile tools 116 and/or dispensing units 114. The movable unit 104 may be an end or head unit of a robotic arm that is moved with the arm or, in other examples, may be a device moved along one or more rails for coordinated movement along an x- and y-axis of a plane. In non-limiting embodiments, the movable unit 104 is configured to rotate itself or a profile tool mounted thereon about any axis. It will be appreciated that various other arrangements are possible. Although the controller 102 is shown in FIG. 1 as being separate from the computing device 100, it will be appreciated the computing device 100 may comprise the controller 102. The computing device 100 is also in communication with a pump controller 107 of a pump 108. The pump controller may include a computing device configured to operate the pump 108 to control the transfer of a hard-setting material mix 110 through a conduit 109.

With continued reference to FIG. 1, the hard-setting material mix 110 may be stored in a vessel 118, such as a pressurized vessel. The conduit 109 includes an end on which a dispensing unit 114 may be disposed. The dispensing unit 114 may include any device configured to dispense the hard-setting material mix 110 such as, but not limited to, a delivery nozzle, an extruder, a conduit outlet, and/or the like. The dispensing unit 114 may be arranged on an end of the movable unit 104. The computing device 100 controls both the controller 102 and the pump controller 107 to respectively operate the movable unit 104 and the pump 108 to dispense the hard-setting material mix 110 based on surface design data. In non-limiting embodiments, the material mix 110 may be dispensed at the rate of 15 liters per minute. In examples in which the dispensing unit 114 is arranged adjacent the profile tool 116, the profile tool 116 may be moved at a speed of 100 millimeters per second or less depending on the dispensing rate of the material mix. It will be appreciated that various other dispensing rates and movement speeds may be used.

As shown in FIG. 1, the material mix 110 may be dispensed in the form of a construction component, such as a panel 106. It will be appreciated that the material mix 110 may be dispensed all at once such that the material mix 110 disperses and fills in a form (e.g., a frame). However, in other examples, the material mix 110 may be selectively dispensed in varying forms, thicknesses, shapes, and/or contours. In non-limiting embodiments, the dispensing unit 114 and pump 108 may selectively dispense the hard-setting material mix 110 at different thicknesses based on surface design data. For example, the hard-setting material mix 110 may be used to three-dimensionally print an unrefined first layer based on the surface design without including all of the final details of the surface design. In some non-limiting embodiments, the material mix 110 may be dispensed without use of the movable unit 104. For example, the material mix 110 may be manually poured into a form prior to engagement with the movable unit 104.

Still referring to FIG. 1, a profile tool 116 is arranged on the movable unit 104. The profile tool 116 may be adapted to manipulate (e.g., modify, compress, scrape, remove, shape, deform, etc.) a surface of the hard-setting material mix 110 in the form of a panel 106 to create one or more three-dimensional surface designs 107. The profile tool 116 may include, in some non-limiting embodiments, a hybrid profile tool that includes both a blade edge and a trowel edge. In non-limiting embodiments, a plurality of profile tools (not shown in FIG. 1) may be used to manipulate the hard-setting material mix 110 in different ways. The different profile tools may be interchanged for different passes over the panel 106 or, in other examples, may be automatically switched by the movable unit 104 and/or controlled by a different movable unit. It will be appreciated that various arrangements of movable units and profile tools may be used to conduct a plurality of passes over the panel with a plurality of different profile tools. In some non-limiting embodiments, the dispensing unit 114 may be arranged in front of and adjacent the profile tool 116 and may be configured to evenly distribute the hard-setting material mix 110 across the width of the profile tool 116.

The surface design data may include various parameters for each surface design to enable a determination, by the computing device 100 and/or controller 102, if the surface design can be formed based on one or more parameters of the panel 106. Such parameters for each surface design may include a maximum depth of the design, a maximum slope of surface features, and a maximum rotation that would be required with the profiling tool along any axis.

Figure 2A:
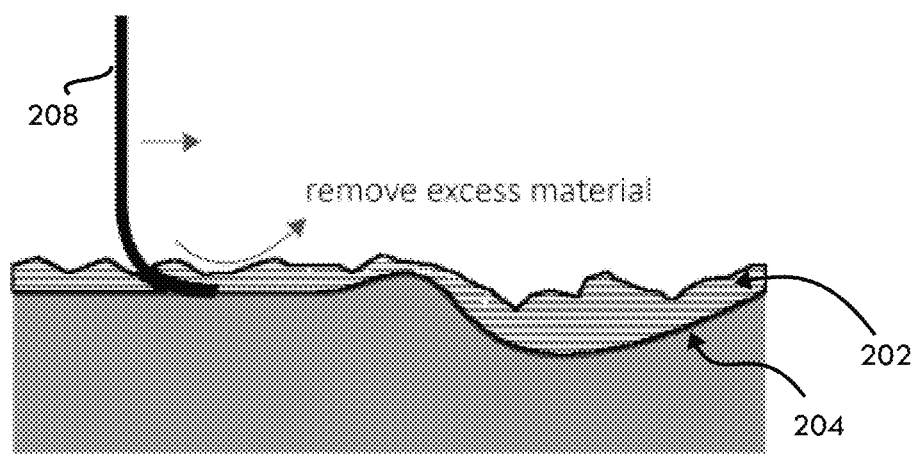
FIG. 2A illustrates a first manipulation of a hard-setting material according to a non-limiting embodiment.

Referring now to FIG. 2A, a first manipulation is illustrated according to a non-limiting embodiment. The first manipulation may be a screed process in which a first profile tool 208 is used to remove excess deposited material 202 from an upper surface of a hard-setting material mix 204 that has not yet set. The profile tool 208 may be moved by the movable unit on one or more axes or planes substantially parallel to the upper surface in accordance with surface design data. The profile tool 208 may also be moved by the movable unit on an axis substantially perpendicular to the upper surface in accordance with surface design data to create contours of varying depths. The surface design data may include a first layer that defines the depth and/or movement of the profile tool 208 during the screed process. The screed process may involve one or more passes over the upper surface with the profile tool 208. The profile tool 208 for the screed process may be a sled-like troweling tool adapted to remove excess material 202 from the upper surface with minimal build-up of material in front of the profile tool 208. The profile tool 208 may be used to achieve a rough shape based on the surface design data.

Figure 2B:
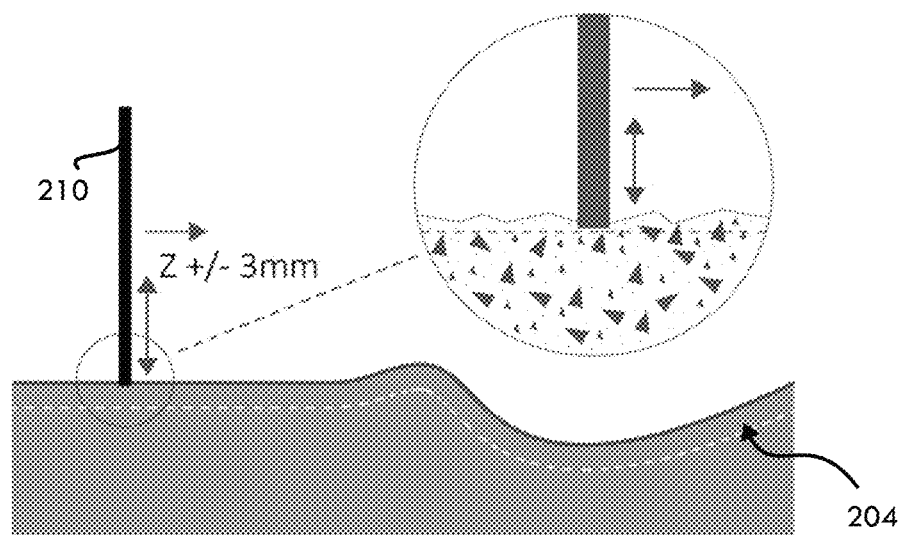
FIG. 2B illustrates a second manipulation of a hard-setting material according to a non-limiting embodiment.

Referring now to FIG. 2B, a second manipulation is illustrated according to a non-limiting embodiment. The second manipulation may be a cutting and/or troweling process that forms a portion of the surface design on an upper surface of the hard-setting material mix 204. A profile tool 210 may be moved by the movable unit on one or more axes or planes substantially parallel to the upper surface in accordance with surface design data. The profile tool 210 may also be moved by the movable unit on an axis substantially perpendicular to the upper surface in accordance with surface design data to vary the depth of a cut. The surface design data may include a second layer that defines the depth and/or movement of the profile tool 210 during the cutting and/or troweling process. The profile tool 210 for the manipulation shown in FIG. 2B may include a blade edge and, in some non-limiting embodiments, may be a hybrid profile tool having a blade edge and a trowel edge. The profile tool 210 may include fins to break apart material along the path of travel. The profile tool 210 may be used to achieve the final shape based on the surface design data.

As shown in FIG. 2B, the profile tool 210 may also be moved repeatedly along an axis substantially perpendicular to the upper surface (e.g., a z-axis) to create smooth modifications to the upper surface of the hard-setting material mix 204. For example, the profile tool 210 may be oscillated or vibrated by a motor arranged on the movable unit. A vibration device including a motor may be externally attached to the movable unit or, in other examples, may be integrated into the movable unit. Different ranges and speeds of z-axis (e.g., vertical) movement may be utilized based on the material properties of the hard-setting material mix, the speed of the profile tool 210 along the axes substantially parallel to the upper surface, and/or user preference. For example, the profile tool 210 may be rapidly oscillated 3 millimeters in each z-axis direction. In non-limiting embodiments, the profile tool 210 may be moved in a sawing motion by adding a z-axis offset (e.g., −3 millimeters) to alternating targets along the planned path of travel.

Figure 2C:
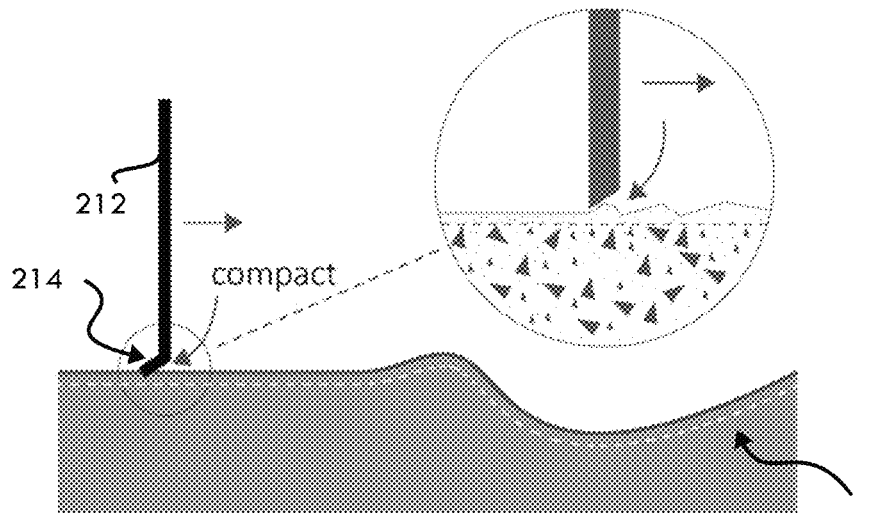
FIG. 2C illustrates a third manipulation of a hard-setting material according to a non-limiting embodiment.

Referring now to FIG. 2C, a third manipulation is illustrated according to a non-limiting embodiment. The third manipulation may be a finishing process that finishes (e.g., smooths, compacts, textures, etc.) the upper surface of the hard-setting material mix 204 before it sets. A profile tool 212 may be moved by the movable unit on one or more axes or planes that are substantially parallel to the upper surface in accordance with surface design data. The profile tool 212 may also be moved by the movable unit on an axis substantially perpendicular to the upper surface in accordance with surface design data to follow the varying depths and contours of the upper surface. The surface design data may include a third layer that defines the depth and/or movement of the profile tool 212 during the finishing process. The profile tool 212 for the finishing process may include a trowel edge 214 and, in some non-limiting embodiments, may be a hybrid profile tool including a blade edge and a trowel edge. A hybrid profile tool may be used to compact fine particulate on an upper surface of the hard-setting material mix 204 for a durable, smooth surface.

Figure 3:
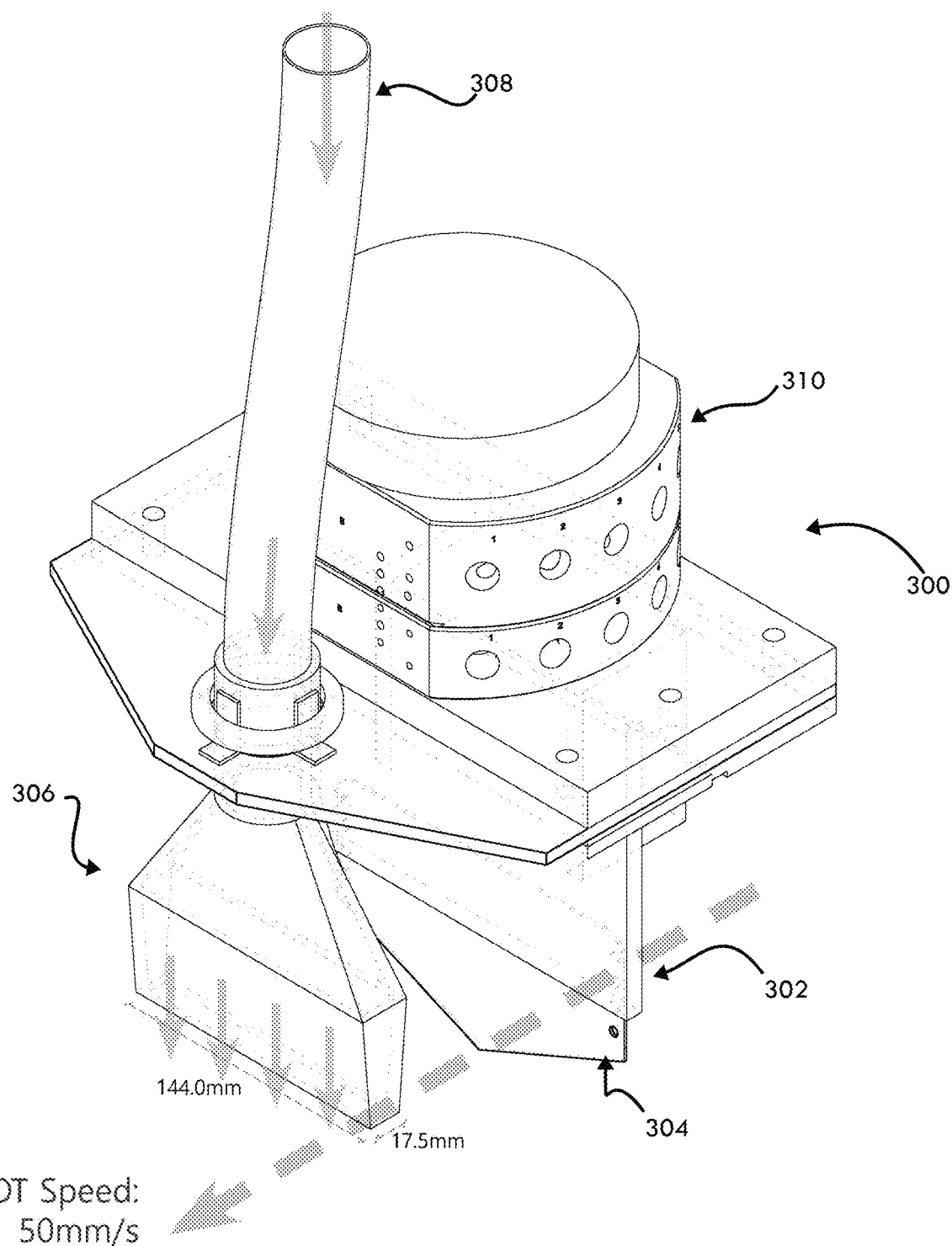
FIG. 3 illustrates a dispensing unit and profile tool installed on a movable unit according to a non-limiting embodiment.

Referring now to FIG. 3, an end 300 of a movable unit is shown according to a non-limiting embodiment. The end 300 of the movable unit 300 includes a chassis 302 for mounting a profile tool 304 and a dispensing unit 306. As shown, the dispensing unit 306 is arranged in front of the profile tool 304 and is in fluid communication with a conduit 308 that provides the hard-setting material mix. A rotatable base 310 allows for rotation of the end 300 of the movable unit with respect to the movable unit (e.g., robotic arm, rail, and/or other form of conveyance mechanism).

Figure 4:
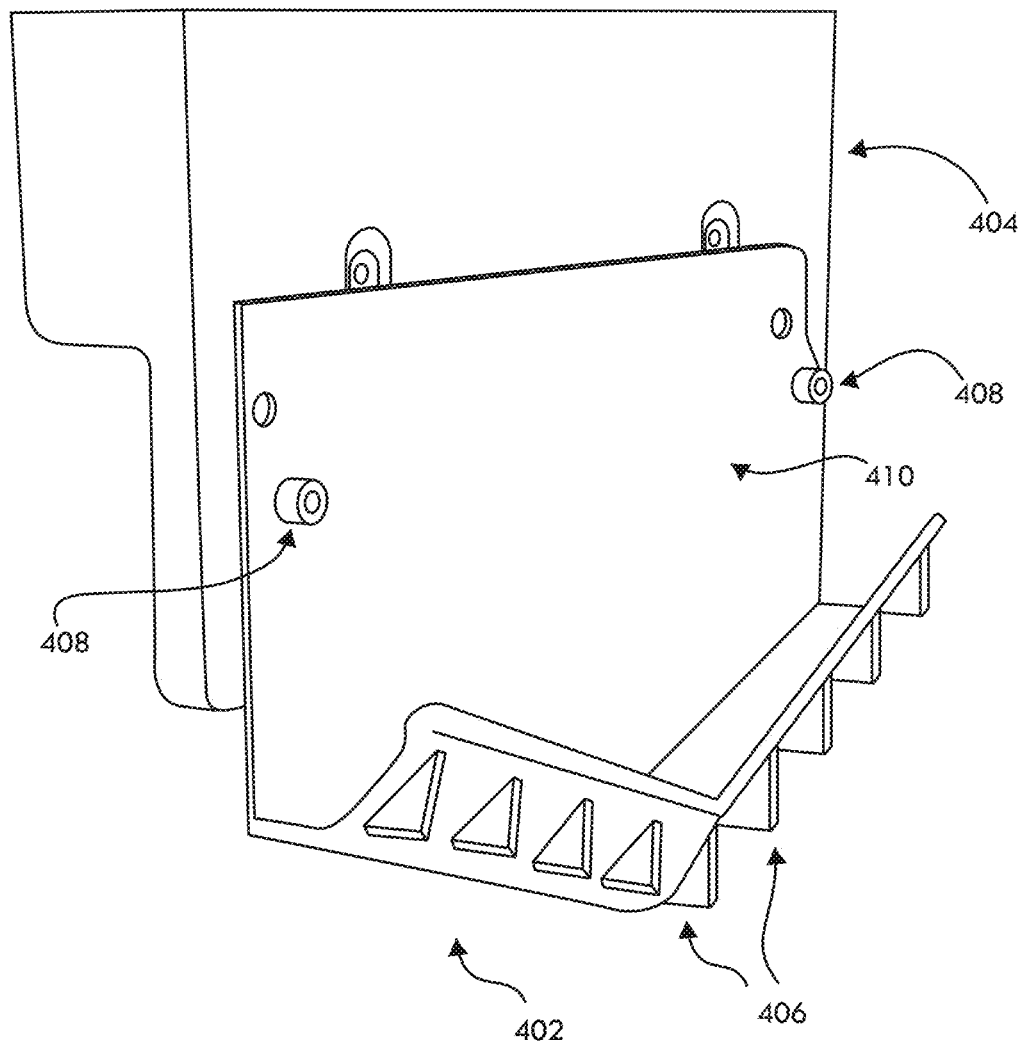
FIG. 4 illustrates a profile tool cartridge installed on a movable unit according to a non-limiting embodiment.

Referring now to FIG. 4, a profile tool 402 is shown mounted on a chassis 404 of an end of a movable unit according to a non-limiting embodiment. The profile tool 402 comprises a plurality of fins 406 for cutting and/or texturing the surface of the hard-setting material mix. The profile tool 402 is mounted on the chassis 404 with bolts 408, although it will be appreciated that various techniques may be used to attach the profile tool 402 to any portion of the end of the movable unit. In some non-limiting embodiments, each profile tool 402 is part of a separate cartridge 410 that can be coupled to the chassis 404. In non-limiting embodiments, the profile tool 402 may be approximately 175 mm wide and cut from 1.5 mm thick stainless steel, although various sizes and dimensions may be used.

Figure 5A:
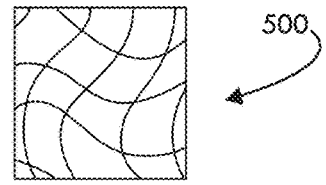
FIG. 5A illustrates a surface design according to a non-limiting embodiment.
Figure 5B:
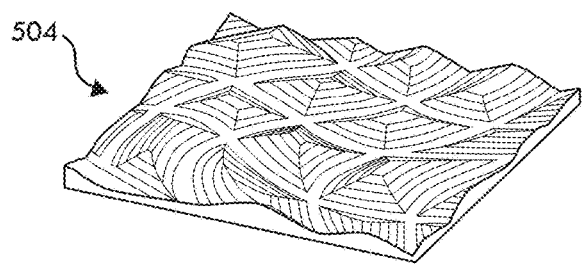
FIGS. 5B-5E illustrate a plurality of construction components formed using the surface design shown in FIG. 5A according to non-limiting embodiments.
Figure 5C:
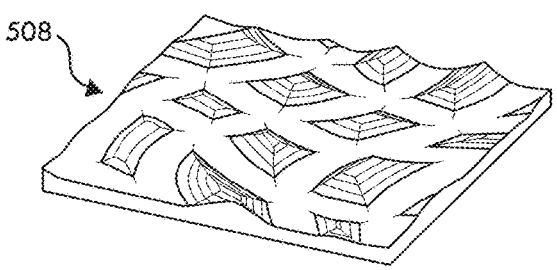
Figure 5D:
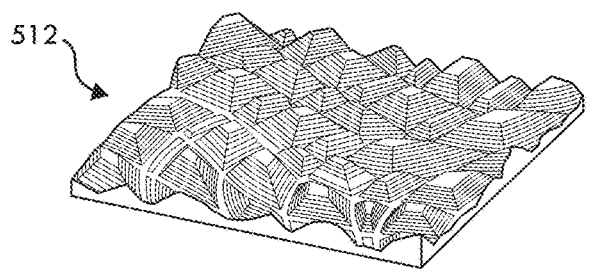
Figure 5E:
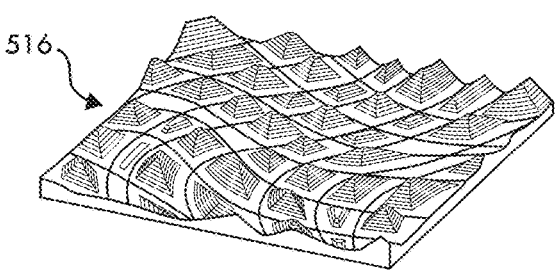

Referring now to FIG. 5A, a surface design 500 is shown according to a non-limiting embodiment. FIGS. 5B-5E illustrate construction components formed using the surface design 500 of FIG. 5A with four different profile tools. FIG. 5B illustrates a panel 504 formed with a one-degree single convex profile tool 506 and using the surface design 500 of FIG. 5A. FIG. 5C illustrates a panel 508 formed with a three-degree single convex profile tool 510 and using the surface design 500 of FIG. 5A. FIG. 5D illustrates a panel 512 formed with a three-degree double convex profile tool 514 and using the surface design 500 of FIG. 5A. FIG. 5E illustrates a panel 516 formed with a three-degree double convex profile tool 518 and using the surface design 500 of FIG. 5A.

Figure 6A:
FIG. 6A illustrates a profile tool according to a non-limiting embodiment.
Figure 6B:
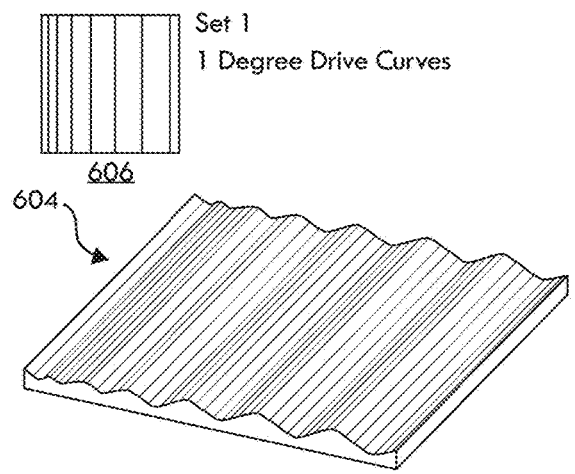
FIGS. 6B-6E illustrate a plurality of construction components formed using the profile tool shown in FIG. 6A according to non-limiting embodiments.
Figure 6C:
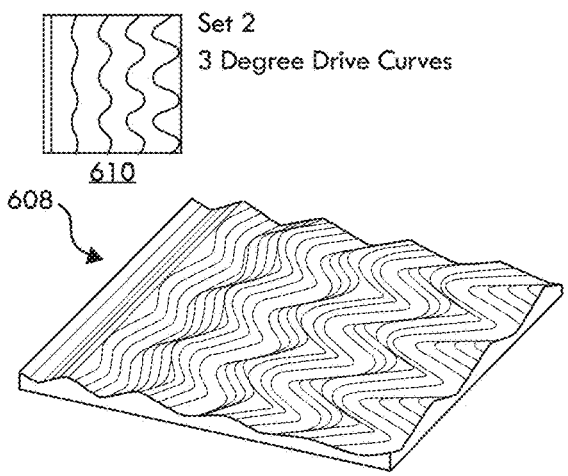
Figure 6D:
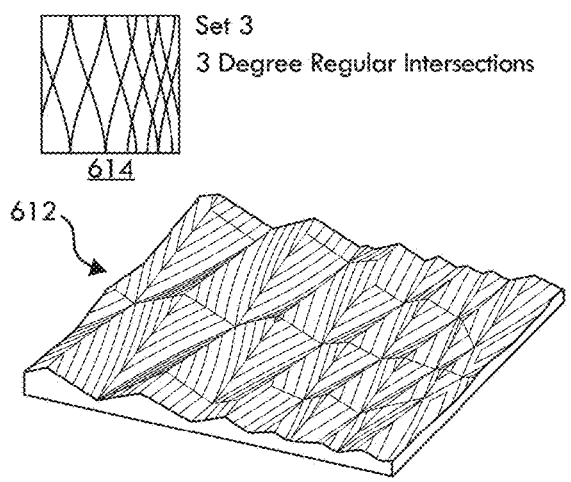
Figure 6E:
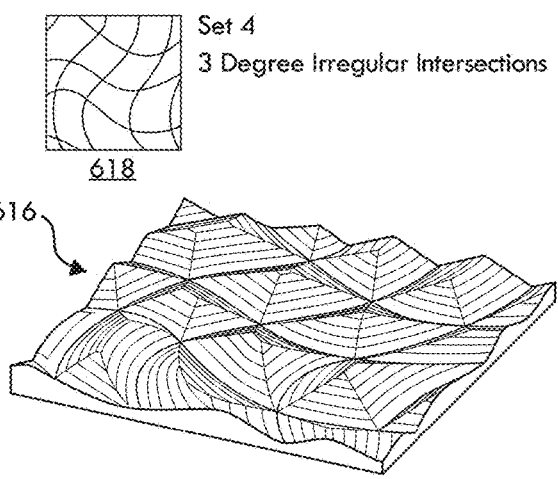

Referring now to FIG. 6A, a profile tool 600 is shown according to a non-limiting embodiment. The profile tool 600 is a one-degree single convex profile tool. FIGS. 6B-6E illustrate construction components formed using the profile tool 600 of FIG. 6A with four different surface designs. FIG. 6B illustrates a panel 604 formed with a one-degree drive curve design 606 and using the profile tool 600 of FIG. 6A. FIG. 6C illustrates a panel 608 formed with a three-degree drive curve design 610 and using the profile tool 600 of FIG. 6A. FIG. 6D illustrates a panel 612 formed with a three-degree regular intersection design and using the profile tool 600 of FIG. 6A. FIG. 6E illustrates a panel 616 formed with a three-degree irregular interaction design 618 and using the profile tool 600 of FIG. 6A.

Figure 7:
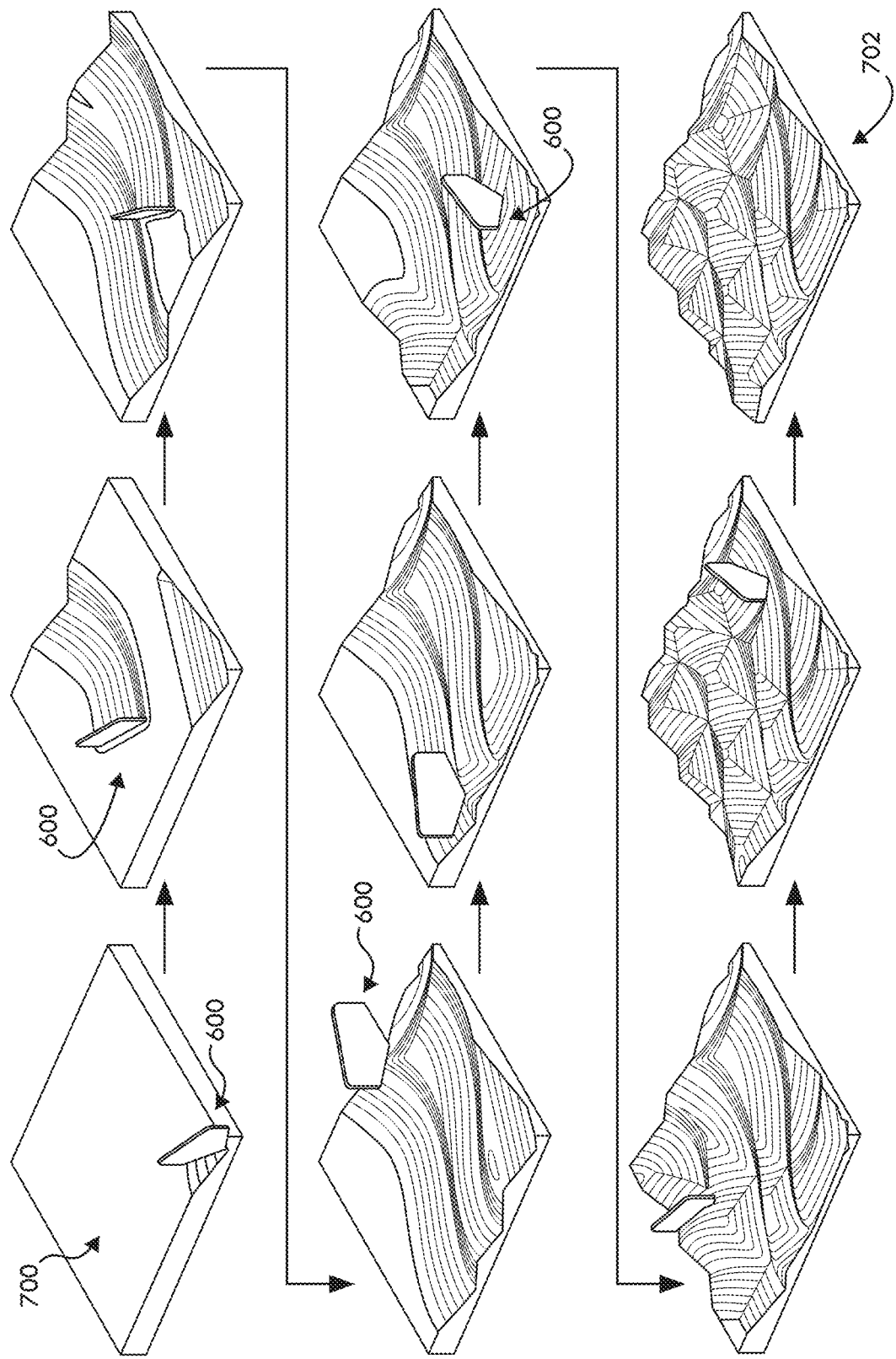
FIG. 7 illustrates a flow of a plurality of passes of a profile tool according to a non-limiting embodiment.

FIG. 7 illustrates a progression of a plurality of passes of a profile tool 600 according to a non-limiting embodiment. The profile tool 600 in this example is a one-degree single convex profile tool as shown in FIG. 6A. FIG. 7 illustrates eight (8) different passes with the profile tool 600 based on the surface design 500 shown in FIG. 5A. The process starts with an unfinished construction component 700 of a hard-setting material mix and results in a construction component 702 having a surface design. The process illustrated in FIG. 7 begins with a fully-formed construction component 700 of a hard-setting material mix that has not yet hardened (e.g., set), although it will be appreciated that, in other non-limiting embodiments, the hard-setting material mix may be selectively deposited throughout the forming process. In non-limiting embodiments, passes may overlap. In non-limiting embodiments, a pass may begin at a starting location on or off the construction component. In non-limiting embodiments, a pass may end at an ending location on or off the construction component. In non-limiting embodiments, a pass may end at a location off the construction component to remove excess material. In non-limiting embodiments, a pass may maintain contact with the upper surface of the material mix during the entire trajectory of that pass.

Figure 8A:
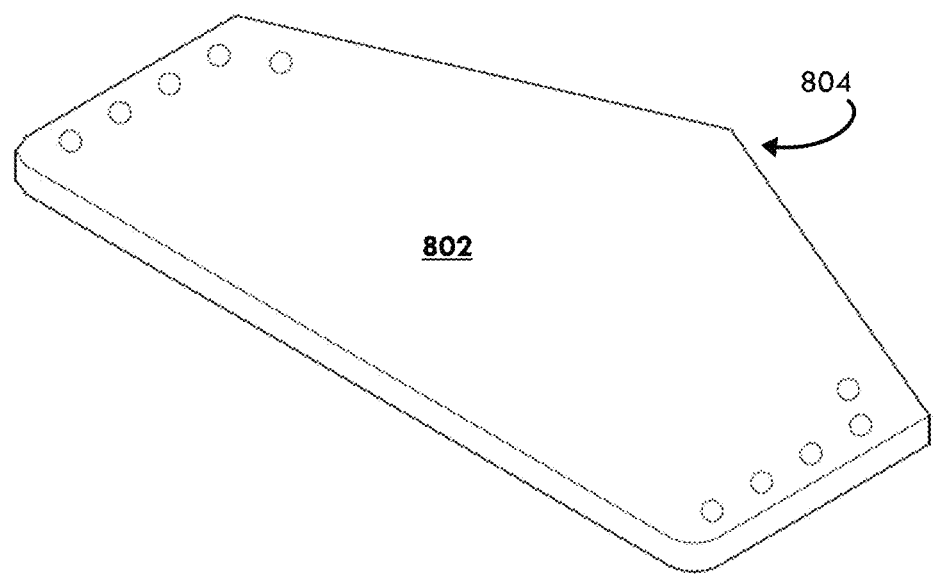
FIGS. 8A-8D illustrate a plurality of profile tools according to non-limiting embodiments.
Figure 8B:
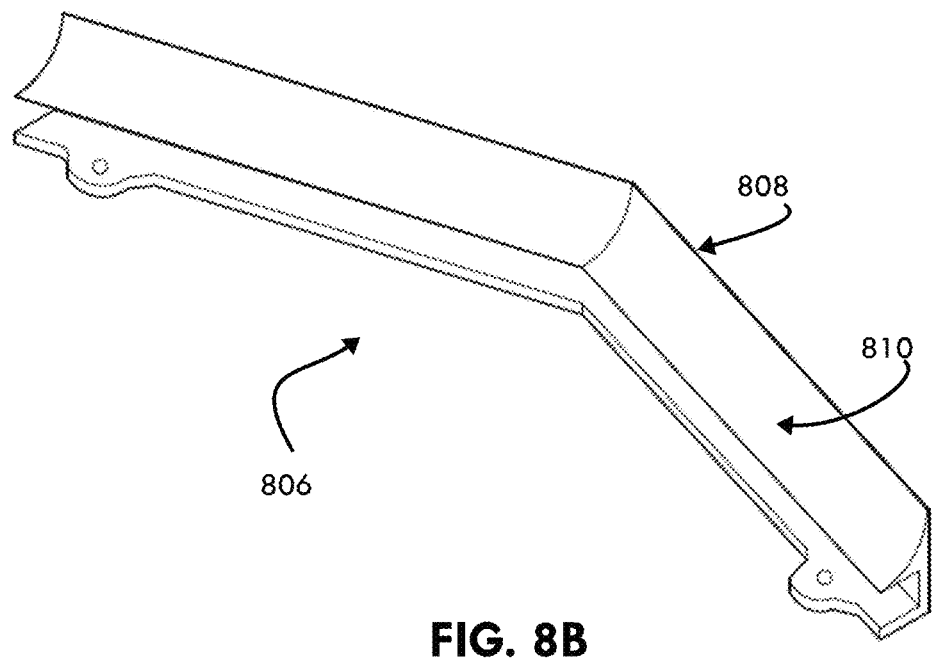
Figure 8C:
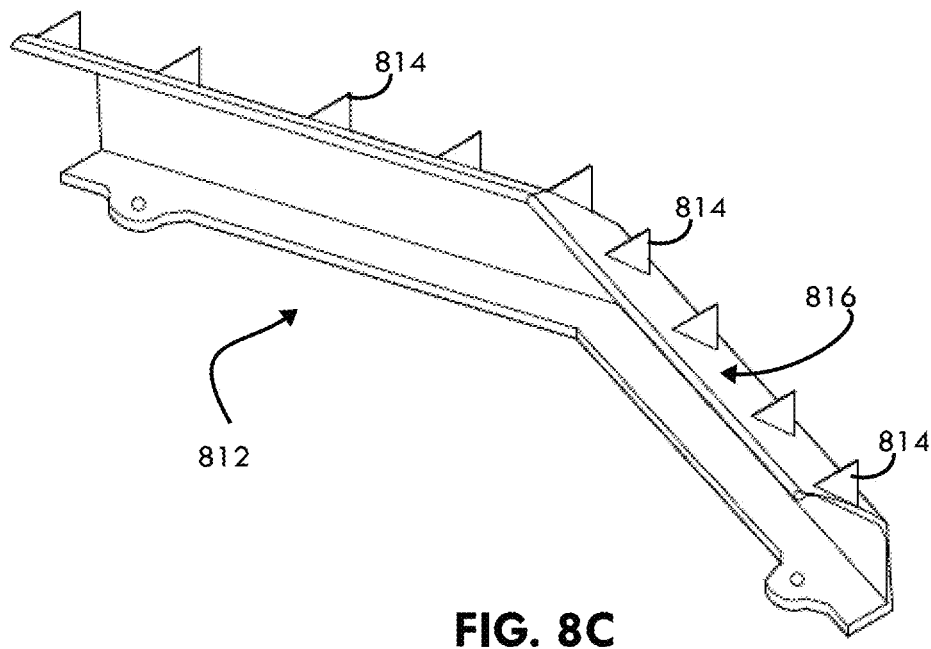
Figure 8D:
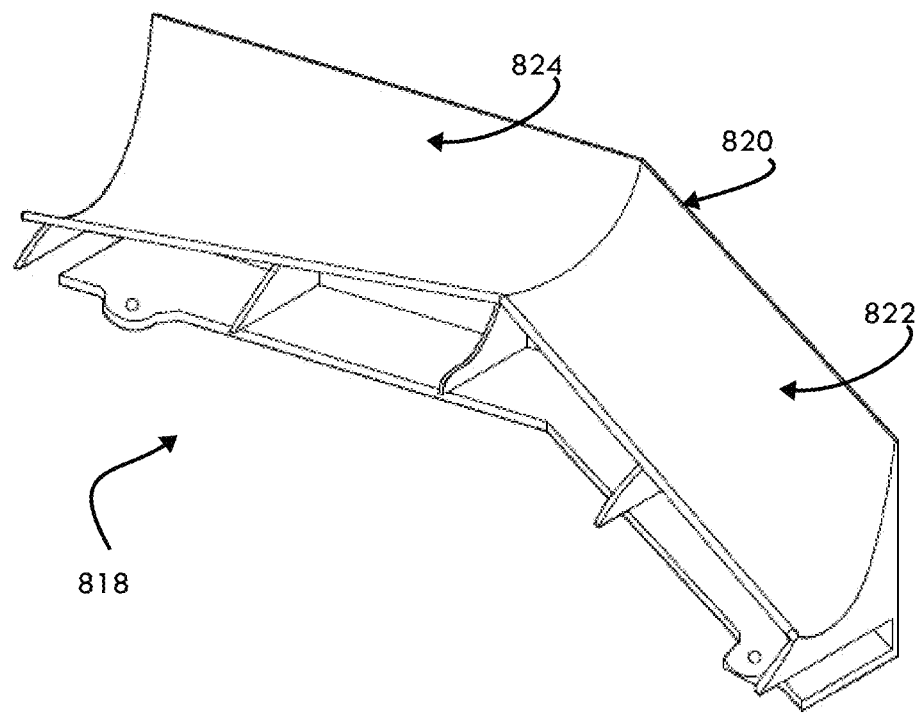

Referring now to FIGS. 8A-8D, a plurality of profile tools is shown according to non-limiting embodiments. FIG. 8A illustrates a blade profile tool 802 according to a non-limiting embodiment. The blade profile tool 802 includes a blade edge 804 that may be used for shaping and finishing. FIG. 8B illustrates a hybrid profile tool 806 according to a non-limiting embodiment. The hybrid profile tool 806 may be used for final finishing and compacting of the hard-setting material mix. The hybrid profile tool 806 includes both a blade edge 808 and a trowel edge 810. FIG. 8C illustrates a shaping profile tool 812 according to a non-limiting embodiment. The shaping profile tool 812 includes a plurality of fins 814 arranged along a trowel edge 816 and adapted to break the hard-setting material mix and impart a rough shape in the material ahead of a subsequent pass with a more precise profile tool, such as the hybrid profile tool 806 shown in FIG. 8B. FIG. 8D illustrates a roughing profile tool 818 according to a non-limiting embodiment. The roughing profile tool 818 includes a blade edge 820 and two trowel edges 822, 824 arranged in a plow shape. For example, the curvature and/or width of the trowel edges 822, 834 may vary to move the excess material up and away from the surface to minimize the effects of dragging the material along the surface. The roughing profile tool 818 may be used to remove excess portions of the hard-setting material mix and to form an initial, rough shape.

Figure 9:
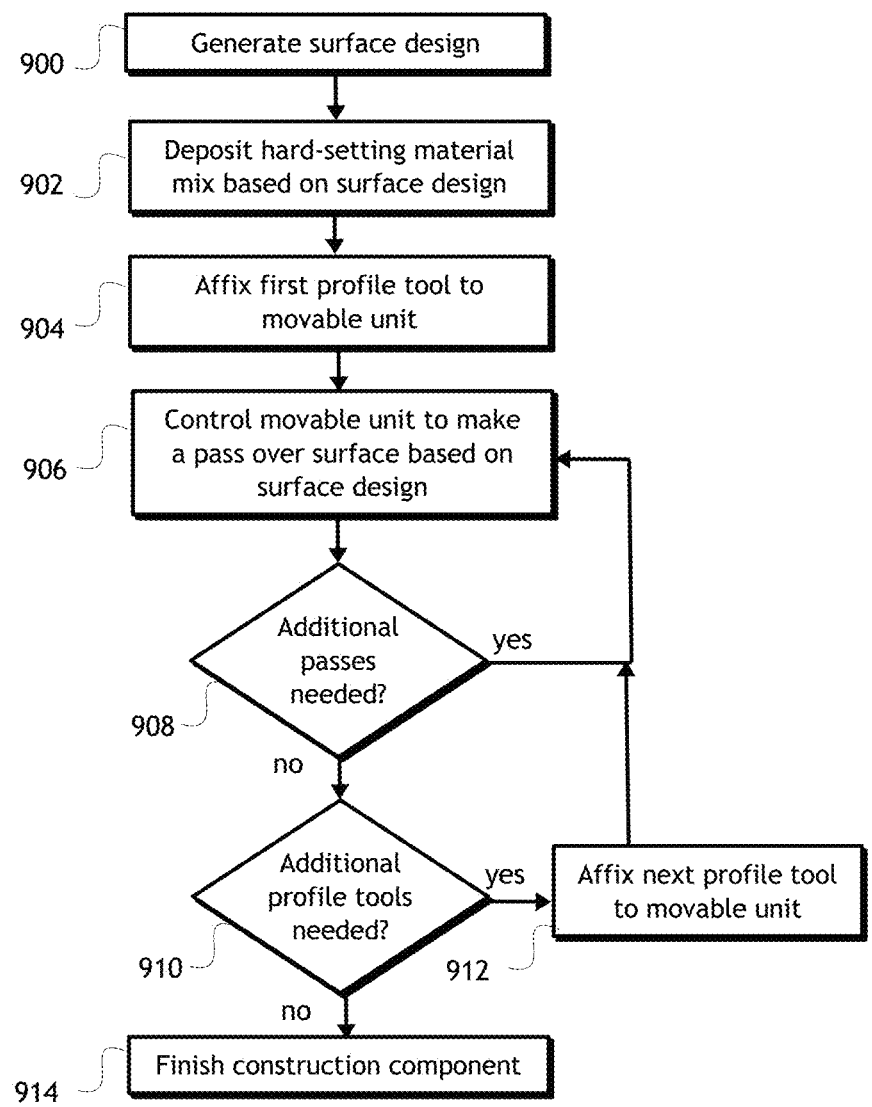
FIG. 9 is a flow diagram of a method for forming surface designs in hard-setting materials according to a non-limiting embodiment.

Referring now to FIG. 9, a flow diagram is shown for a method of forming construction components with three-dimensional surface designs according to a non-limiting embodiment. At a first step 900, surface design data is generated. It will be appreciated that, in some non-limiting embodiments, the surface design data may be preexisting and stored in a database. At step 902, a hard-setting material mix is deposited onto a surface based on the surface design data. As explained herein, in some non-limiting embodiments the hard-setting material mix may be selectively dispensed from a dispensing unit throughout the process. In other non-limiting embodiments, the hard-setting material mix may be dispensed at one time. Accordingly, step 902 may occur once for each construction component or, in other examples, may occur concurrent with step 906.

With continued reference to FIG. 9, at a next step 904, a first profile tool is affixed to a movable unit. The first profile tool may, in some examples, be a screed tool adapted to remove excess material mix from the upper surface. Once the first profile tool is affixed, the method may proceed to step 906 in which the movable unit is controlled to make a single pass over the surface of the hard-setting material mix with the first profile tool. The single pass may include a starting location (e.g., represented by x, y, z coordinates), an ending location (e.g., represented by x, y, z, coordinates), and a trajectory (represented by one or more curve geometries) as specified by the surface design data. At step 908, the computing device controlling the movable unit determines if additional passes are needed with the existing profile tool based on, for example, the surface design data. If the computing device determines that additional passes are needed at step 908, the method may proceed back to step 906 and a next pass may be performed over the surface. This may be repeated for as many passes as specified by the surface design data.

Still referring to FIG. 9, if the computing device determines that additional passes are not needed at step 908, the method may proceed to step 910 during which the computing device determines if additional profile tools are needed. For example, the surface design data may define a plurality of layers that are each formed with different profile tools. If it is determined at step 910 that an additional profile tool is needed, the method proceeds to step 912 and a next profile tool is affixed to the movable unit. In some examples, the computing device may display a prompt to the user to change the profile tool and may identify the next profile tool to use. In some non-limiting examples, the computing device may automatically interchange the profile tools with an additional robotic arm or the like. After the next profile tool is affixed to the movable unit at step 912, the method proceeds back to step 906 to make a pass over the surface with the next profile tool and, after that pass, to step 908 to determine if additional passes are needed with the next profile tool. Steps 906 and 908 may repeat as described before until all passes are completed with that tool. If it is determined at step 910 that additional profile tools are not needed, the method may proceed to step 914 in which any final actions are performed to finish the construction component. For example, the construction component may be set, cured, sanded, and/or the like.

The use of multiple passes with one or more profile tools allows for the deposition and shaping trajectories to be decoupled and permits iterative refinement of the surface. This is advantageous over techniques for contour crafting in which a flat troweling tool is used in a single deposition-and-shaping process with a single trajectory (e.g., single pass), which only contacts the surface once and has limitations on the degree of refinement available. With such troweling techniques, there may be a one-to-one correspondence between each extrusion (e.g., deposit) step height and each tool contact, where the smoothing action of a straight trowel is used to refine a global shape resulting from layered buildup. As a result, seams between layers are often visible and cold joints between layers can cause structural issues.

In non-limiting embodiments, the hard-setting material mix may be created based on workability, strength, and aggregate size for the intended purpose of the construction component. Workability is a measure of yield stress and consistency that may be evaluated in terms of slump or slump spread. In non-limiting embodiments, the hard-setting material mix is adapted to remain workable enough for effective and efficient deposition, while being stiff enough to maintain its shape after being tooled. In non-limiting embodiments, concrete sand with a large percentage of aggregate fines may be used. To reduce a water-to-cement ratio while improving workability, admixtures may be added to the mixture. For example, one or more superplasticizers may be used, such as polycarboxylate ether formed as a copolymer of polymethacrylic acid and polyethylene glycol methacrylate. In non-limiting embodiments, the material mix may also include a viscosity-modifying agent, to reduce segregation and bleeding along with modifying flow properties. This agent may provide for a thicker mixture for increased controlled flow and to prevent separation from occurring between the aggregate and water. As an example, type I/II Saylor's cement may be used with water. In a non-limiting embodiment, a hard-setting material mix may be formed from 2 kg of water, 5 kg of cement, 10 kg of aggregate, 32 ml of superplasticizer, and 45 ml of a viscosity-modifying agent. It will be appreciated that numerous other variations, ratios, and mixtures are possible.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A method for forming construction components with three-dimensional surface designs, comprising:
   depositing a hard-setting material mix to create a construction component;
   controlling, with at least one processor, a movable unit comprising a robotic arm or a print head to manipulate a surface of the construction component with a first profile tool arranged on the movable unit based on surface design data before the hard-setting material mix sets, the surface design data comprising layer data for each layer of a plurality of layers, each layer corresponding to a different profile tool of a plurality of profile tools including the first profile tool and a second profile tool, wherein the first profile tool comprises a blade edge and a trowel edge; and
   controlling, with at least one processor, the movable unit or at least one other movable unit to manipulate the surface of the construction component with the second profile tool arranged on the movable unit or the at least one other movable unit based on the layer data for at least one layer of the plurality of layers before the hard-setting material mix sets, wherein the second profile tool comprises a blade edge and a trowel edge, and wherein the trowel edge of the first profile tool comprises a different shape than the trowel edge of the second profile tool.

2. The method of claim 1, wherein controlling the movable unit to manipulate the surface of the construction component with the first profile tool comprises repeatedly moving the first profile tool along an axis substantially perpendicular to the surface of the construction component while simultaneously moving the first profile tool along an axis substantially parallel to the surface of the construction component.

3. The method of claim 2, wherein repeatedly moving the first profile tool along the axis substantially perpendicular to the surface of the construction component comprises oscillating the first profile tool.

4. The method of claim 1, wherein depositing the hard-setting material mix comprises:
   controlling, with at least one processor, a pump to move the hard-setting material mix from a pressurized vessel through a conduit, wherein an end of the conduit comprises a dispensing unit arranged on the movable unit; and
   controlling, with at least one processor, the movable unit to selectively deposit the hard-setting material mix from the dispensing unit.

5. The method of claim 4, wherein the first profile tool is arranged adjacent to the end of the conduit such that the hard-setting material mix is manipulated by the first profile tool as it is being deposited.

6. The method of claim 1, wherein the hard-setting material mix is deposited within a panel frame.

7. A system for forming construction components from a hard-setting material mix, comprising:
   at least one movable unit configured to move in three dimensions;
   a first profile tool attached to the at least one movable unit and comprising a blade edge and a trowel edge;
   a second profile tool attached to the at least one movable unit and comprising a blade edge and a trowel edge, wherein the trowel edge of the first profile tool comprises a different shape than the trowel edge of the second profile tool; and
   at least one processor programmed or configured to:
      control the at least one movable unit to manipulate a surface of a construction component formed with the hard-setting material mix with the first profile tool based on surface design data before the hard-setting material mix sets, the surface design data comprising layer data for each layer of a plurality of layers, each layer corresponding to a different profile tool of a plurality of profile tools including the first profile tool and the second profile tool; and
      control the at least one movable unit to manipulate the surface of the construction component with the second profile tool based on the layer data for at least one layer of the plurality of layers before the hard-setting material mix sets.

8. The system of claim 7, wherein the at least one processor is further programmed or configured to repeatedly move at least one of the first profile tool and the second profile tool along an axis substantially perpendicular to the surface of the construction component while simultaneously manipulating the surface of the construction component with at least one of the first profile tool and the second profile tool.

\* \* \* \* \*